US012423413B2

(12) United States Patent
Ambrosi et al.

(10) Patent No.: US 12,423,413 B2
(45) Date of Patent: Sep. 23, 2025

(54) PROGRAM FILE MEASUREMENTS FOR CONTEXT-SPECIFIC VALIDATION

(71) Applicant: HEWLETT PACKARD ENTERPRISE DEVELOPMENT LP, Spring, TX (US)

(72) Inventors: Joao Claudio Ambrosi, Rio Grande do Sul (BR); Joaquim Gomes Da Costa Eulalio De Souza, Rio Grande do Sul (BR); Reinaldo Cézar De Morais Gomes, Paraíba (BR); Marcela Galdino, Paraiba (BR); Ramon Sousa Sarmento, Paraiba (BR)

(73) Assignee: Hewlett Packard Enterprise Development LP, Spring, TX (US)

( * ) Notice: Subject to any disclaimer, the term of this patent is extended or adjusted under 35 U.S.C. 154(b) by 291 days.

(21) Appl. No.: 18/067,945

(22) Filed: Dec. 19, 2022

(65) Prior Publication Data
US 2024/0202318 A1    Jun. 20, 2024

(51) Int. Cl.
*G06F 21/54*    (2013.01)
*G06F 21/64*    (2013.01)

(52) U.S. Cl.
CPC .............. *G06F 21/54* (2013.01); *G06F 21/64* (2013.01)

(58) Field of Classification Search
CPC .................................. G06F 21/54; G06F 21/64
See application file for complete search history.

(56) References Cited

U.S. PATENT DOCUMENTS

| | | | |
|---|---|---|---|
| 9,294,282 B1* | 3/2016 | Potlapally | H04L 9/3236 |
| 2008/0086317 A1* | 4/2008 | Jones | G06Q 10/10 |
| | | | 705/325 |
| 2013/0198838 A1* | 8/2013 | Schmidt | H04L 63/126 |
| | | | 726/22 |
| 2017/0116415 A1* | 4/2017 | Stopel | G06F 21/52 |
| 2017/0187540 A1* | 6/2017 | Stopel | H04L 63/1433 |
| 2018/0121485 A1* | 5/2018 | Jayanthi | G06F 16/128 |
| 2019/0081983 A1* | 3/2019 | Teal | H04L 47/2475 |
| 2021/0004472 A1* | 1/2021 | Almeida | G06F 21/602 |
| 2022/0360594 A1* | 11/2022 | Cosgrove | H04L 63/1416 |

OTHER PUBLICATIONS

Benedictis, M.D., et al., "Integrity verification of Docker containers for a lightweight cloud environment", Feb. 5, 2019, pp. 38.
Silvia, S., "Verification of Software Integrity in Distributed Systems", Politecnico Di Torino, 2020-2021, pp. 200.

* cited by examiner

*Primary Examiner* — Anthony D Brown
*Assistant Examiner* — Kamryn J. Gillespie
(74) *Attorney, Agent, or Firm* — Trop, Pruner & Hu, P.C.

(57) ABSTRACT

In some examples, during runtime of a virtual computing environment, a system intercepts a call for an invocation of a program file that relates to a program execution in the virtual computing environment, and obtains, for the program file prior to the invocation of the program file in response to the call, context information of the virtual computing environment. The context information includes an identifier of a program code image for the virtual computing environment. The system computes a measurement value based on the program file, and provides the measurement value and the context information of the virtual computing environment to an integrity checker to perform a context-specific validation of the program file.

20 Claims, 7 Drawing Sheets

PROGRAM FILE MEASUREMENTS FOR CONTEXT-SPECIFIC VALIDATION

BACKGROUND

A computer system can execute programs (including machine-readable instructions) to perform target tasks. Programs can include an operating system (OS), application programs, scripts, firmware, services, and/or other types of programs. The programs may become corrupted, such as due to attacks that modify program files or replace program files with unauthorized program files. Additionally, attackers may introduce unauthorized program code that can perform unauthorized actions in the computer system.

BRIEF DESCRIPTION OF THE DRAWINGS

Some implementations of the present disclosure are described with respect to the following figures.

Figure 1:
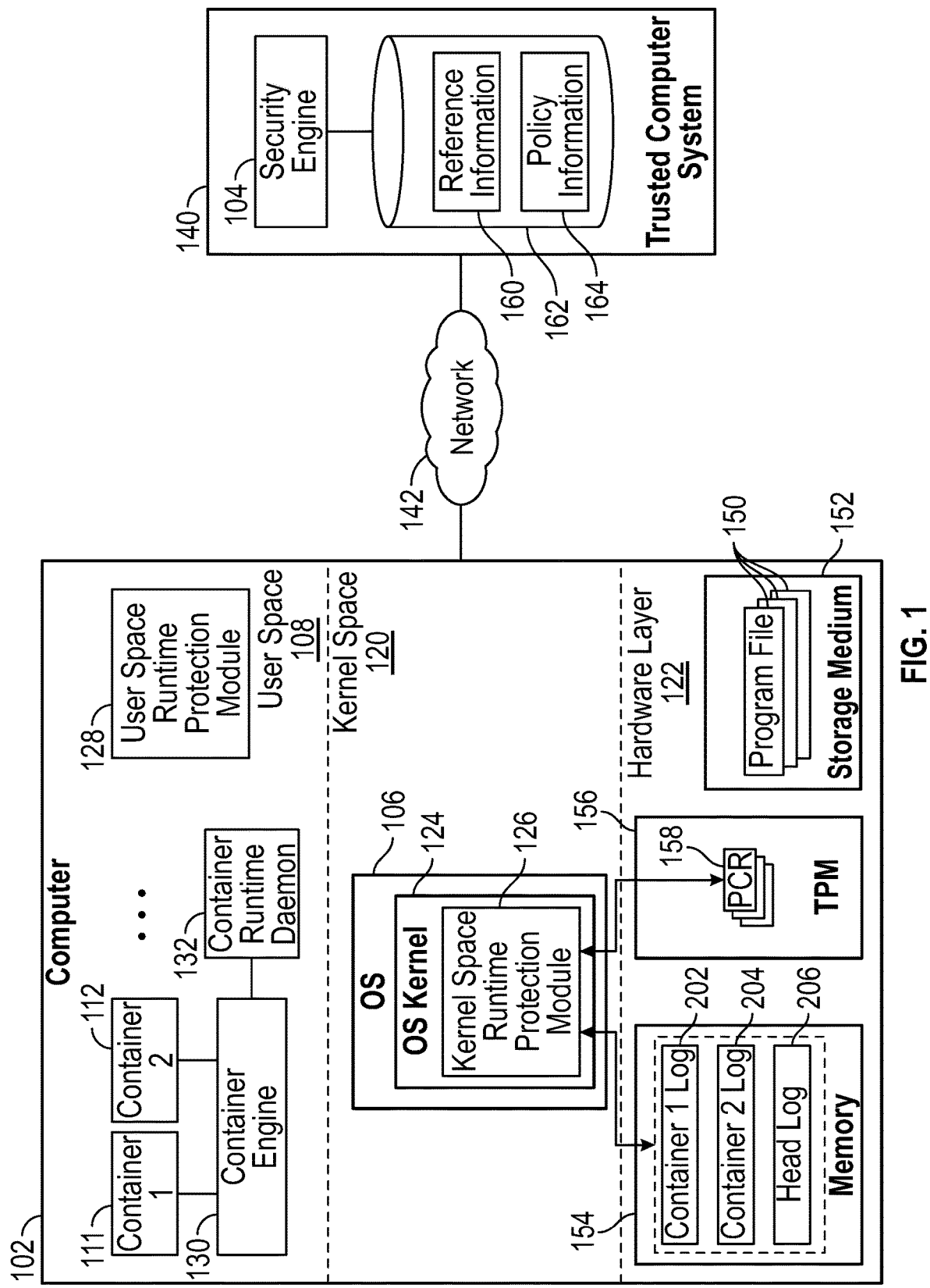
FIG. 1 is a block diagram of an arrangement that includes a computer and a security engine, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A computer system can execute programs in virtual computing environments that can be isolated from one another. In some examples, virtual computing environments can include containers or virtual machines (VMs). A VM includes a guest operating system (OS) and other program(s) that run in a context provided by the guest OS. Different VMs in a computer system can run their respective guest OSs. A hypervisor or virtual machine monitor (VMM) is provided in the computer system to manage VMs (e.g., create VMs, tear down VMs, etc.) and to manage the virtualization of hardware resources of the computer system.

Containers in a computer system do not include their own OSs, but instead the containers are run on a host OS of the computer system. Programs (e.g., application programs or other services) can execute in respective containers. Containers provide "lightweight" virtual computing environments since they do not have to execute guest OSs, and further, a hypervisor or VMM does not have to be deployed. An example of a computing environment in which containers are provided includes a Kubernetes cluster. The Kubernetes cluster includes compute nodes on which are executed pods, where each pod can include a collection of containers (a single container or multiple containers). In further examples, containers can be run directly on bare metal servers or in VMs.

More generally, virtual computing environments define isolated environments in which respective programs are executed. The virtual computing environments are part of a virtualization layer and can share resources (including hardware resources, program resources, etc.) of a computer system.

Attackers (e.g., humans, programs, or machines) can cause unauthorized actions to be performed in virtual computing environments. For example, an attacker can introduce unauthorized program code into a virtual computing environment. As further examples, an attacker can alter or replace program files associated with a virtual computing environment. A "program file" can refer to a file containing program code (scripts, source code, or executable code), data, and/or a configuration file containing configuration information for a program, and/or any other type of object or collection of objects that affects how a program executes. As an example, in a computer system that runs containers, program files can include or be included in container images that define the containers and the programs running in the containers. Program files can further include other files that can be invoked during execution of a program(s) in a container In some examples, integrity management systems can be used to check the integrity of program files, such as container images. For example, an integrity management system can validate the integrity of a container image prior to execution of the respective container. Validating the integrity of the container image can include any or some combination of the following: checking that a digital signature associated with the container image is valid, computing a checksum (e.g., a cryptographic hash value or another value) based on content and attributes of the container image, and verifying that the checksum indicates that the container image has not been tampered with, and/or other verification tasks.

Although an integrity management system that validates the integrity of a container image prior to execution of the container can prevent the execution of the container based on a corrupted container image, the integrity management system may not be able to protect a container after the container has started execution (referred to as a "runtime" of the container). Attackers can corrupt the container after validation of the container image and deployment of the container based on the validated container image. An attacker can corrupt the container during runtime of the container by altering program files used by the container, suppressing the performance of certain actions, modifying data values or the arrangement of the data values, leaking confidential data, and/or injecting unauthorized program code into the container.

In accordance with some implementations of the present disclosure, a runtime protection mechanism supports runtime integrity checking of a virtual computing environment, such as a container. During the runtime of the virtual computing environment, the runtime protection mechanism intercepts an invocation of a program file that relates to a program execution in the virtual computing environment, and obtains, for the program file prior to the execution or modification of the program file, context information of the program file and of the virtual computing environment. The context information includes an identifier of a program code image for the virtual computing environment (e.g., a container image identifier), along with possibly other context information. The runtime protection mechanism computes a measurement value based on the program file, and provides the measurement value and the context information to an integrity checker to perform a context-specific validation of the program file. The runtime protection mechanism performs the validation of the program file as the program file is invoked during runtime prior to allowing invocation of the program file.

The runtime protection mechanism is able to protect a virtual computing environment during a runtime of the virtual computing environment after the virtual computing environment has been deployed based on a program image (e.g., a container image) for the virtual computing environment. Additionally, by being able to obtain context information for an invocation of a program file that affects an operation of the virtual computing environment, the integrity check performed for the program file can vary based on a context associated with the invocation of the program file. The context-specific integrity check can apply different policies for different contexts. For example, actions that may be allowed in one context may not be allowed in a different context. In this way, flexibility in integrity checking of program file invocations is enhanced since different policies can be applied for the integrity checking for different contexts.

Additionally, the ability to obtain context information for a program file that is invoked allows the runtime protection mechanism to become aware of the context for each virtual computing environment, such as a container. Traditional integrity management systems are not container-aware, i.e., such integrity management systems are not able to determine the context for each container and thus are unable to perform integrity checks for individual containers.

FIG. 1 is a block diagram of an example arrangement that includes a computer 102 and a security engine 104 that is remotely located from the computer 102. In other examples, the security engine 104 is part of the computer 102. The security engine 104 is to verify the integrity of programs running in the computer 102. The computer 102 can also be referred to as a "host computer" that hosts the execution of programs, such as in virtual computing environments, in the computer 102. Although FIG. 1 shows one computer 102, in other examples, multiple host computers can be present and subjected to verification by the security engine 104.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

In some examples, the computer 102 can execute programs in respective containers, including containers 111, 112, and so forth. Although reference is made to containers in some examples, it is noted that techniques or mechanisms according to some implementations of the present disclosure can be extended to protecting programs executed in other types of virtual computing environments, such as VMs. Moreover, in some examples, the containers 111, 112 can be executed in VMs. More generally, the computer 102 can execute programs in a collection of virtual computing environments (including a single virtual computing environment or multiple virtual computing environments) in the computer 102. As used here, a "collection" of items can refer to a single item or multiple items.

The containers 111, 112 in the computer 102 are run on an OS 106 of the computer 102. The OS 106 can also be referred to as a "host OS," since the OS 106 is the OS of the computer 102. A host OS differs from a guest OS executed in a VM, for example. In some examples, the OS 106 includes a Linux OS. In other examples, other types of OSs can be employed, such as a WINDOWS OS, a UNIX OS, a Mac OS, an ANDROID OS, iOS, and so forth.

The computer 102 includes several layers, including a user space 108, a kernel space 120, and a hardware layer 122. The hardware layer 122 includes hardware resources, such as a storage medium 152, a memory 154, and a trusted platform module (TPM) 156. The storage medium 152 can be implemented using a collection of storage devices (a single storage device or multiple storage devices), such as a disk-based storage device, a solid state drive, and so forth. The memory 154 can be implemented using a collection of memory devices (a single memory device or multiple memory devices), such as a dynamic random access memory (DRAM) memory device, a static random access memory (SRAM) device, a flash memory device, and so forth.

The TPM 156 is an example of a security processor that can perform various hardware-based, security-related tasks. The security processor can perform various cryptographic operations, for example. The security processor may also include security mechanisms to make the security processor tamper-resistant, such that malicious programs would be unable to tamper with the security tasks performed by the security processor. The TPM 156 may be a hardware component or may be part of a hypervisor virtualization platform, in some examples.

The user space 108 includes the containers 111, 112, as well as other components (discussed further below). The kernel space 120 includes an OS kernel 124 of the OS 106. The OS kernel 124 is the core of the OS 106 that has control over resources (hardware resources, program resources, etc.) of the computer 102. The OS kernel 124 can also manage interactions between hardware and programs of the computer 102. In some cases, a portion of the OS 106 may reside in the user space 108.

The kernel space 120 is reserved for running programs (including the OS kernel 124) that have specified higher privileges than other programs. Programs with lower privileges than the OS kernel 124 execute in the user space 108. Programs with higher privileges are able to perform certain operations and access certain resources (e.g., hardware resources, program resources, data, etc.) that are not available to programs with lower privileges.

In accordance with some implementations of the present disclosure, a runtime protection mechanism is provided to protect the integrity of the containers 111, 112 during runtime of the containers 111, 112. The runtime protection mechanism includes an in-host part in the computer 102, and a remote part that is external of the computer 102.

As shown in FIG. 1, the in-host part of the runtime protection mechanism includes a kernel space runtime protection module 126 implemented with machine-readable instructions that execute in the kernel space 120, and a user space runtime protection module 128 implemented with machine-readable instructions that execute in the user space 108. In some examples, the kernel space runtime protection module 126 can be part of the OS kernel 124. In other examples, the kernel space runtime protection module 126 can be separate from the OS kernel 124. In some examples, the user space runtime protection module 128 can be executed as part of a container, or outside of a container.

The external part of the runtime protection mechanism includes the security engine 104, which performs the integrity validation of program files in the computer 102 as the program files are invoked by the containers 111, 112. The integrity validation performed by the security engine 104 is based on information provided by the in-host part of the runtime protection mechanism to the security engine 104. In alternative examples, the security engine 104 may be implemented inside the computer 102 to be protected.

In some examples, the security engine 104 can be run in a trusted computer system 140. A "trusted" computer system can refer to a computer system (including one computer or multiple computers) that is provided with a security mechanism to protect the computer system from intrusion or attack. For example, the trusted computing system 140 may be run in a secure network.

The trusted computing system 140 is coupled over a network 142 to the computer 102 (or to multiple computers) to be protected. The network 142 can include a local area network (LAN), a wide area network print (WAN), or another type of network. In other examples, the security engine 104 can be executed in a virtual computer, such as a VM.

In some examples, the computer 102 also includes a container engine 130, which includes machine-readable instructions executable in the user space 108. The container engine 130 supports use of the containers 111, 112. In some examples, the container engine 130 can include any or some combination of the following: a containerd daemon, a Docker container engine, a CRI-O container engine, an RKT container engine, an LXD container engine, and so forth. The container engine 130 receives input (such as from a user through a user interface provided by the container engine 130) relating to building container images and starting or managing containers based on the container images. A "container image" can refer to program code that when executed launches a container and one or more programs executable in the container. The container engine 130 can load a container image (e.g., from a repository in the computer or at a remote location such as a cloud, a web service, etc.) to create, compose or launch a corresponding container.

In some examples, the container engine 130 can interact with a container runtime daemon 132 to manage containers. The container runtime daemon 132 may be part of or separate from the container engine 130. The container runtime daemon 132 can interact with the OS kernel 124 to create, start, stop, and destroy a container. Examples of container runtime daemons include a containerd daemon, a dockerd daemon, and so forth. Although referred to as a "daemon" (which is a background process), a container runtime can be implemented as a foreground process in other examples.

In some examples, a container orchestrator (not shown) such as Kubernetes can be employed to control how and where containers will run across a cluster of compute nodes. A "compute node" can refer to either a physical computer such as the computer 102 or a VM. The container orchestrator can schedule execution of containers in the compute nodes based on available compute resources and resource requirements of the containers. A Kubernetes cluster can include one or more control nodes and a number of compute nodes (also referred to as "worker nodes") on which containers are deployed. The control node executes the container orchestrator. In other examples, a container orchestrator such as Kubernetes is not employed.

In examples where the computer 102 includes VMs instead of containers as virtual computing environments, the containers 111, 112 can be replaced with VMs, and the container engine 130 can be replaced with a hypervisor or VMM. Also, the VMs would execute respective guest OSs. In further examples, the containers 111, 112 would execute in VMs.

During runtime of a container (e.g., 111 or 112), a program running in the container can issue calls that invoke program files 150 stored in a storage medium 152. As noted above, a program file can refer to a file containing program code (scripts, source code, or executable code), data, and/or a configuration file containing configuration information for a program, and/or any other type of object or collection of objects that affects how a program executes. A "file" can refer to any type of object that contains any of the foregoing content.

Figure 2:
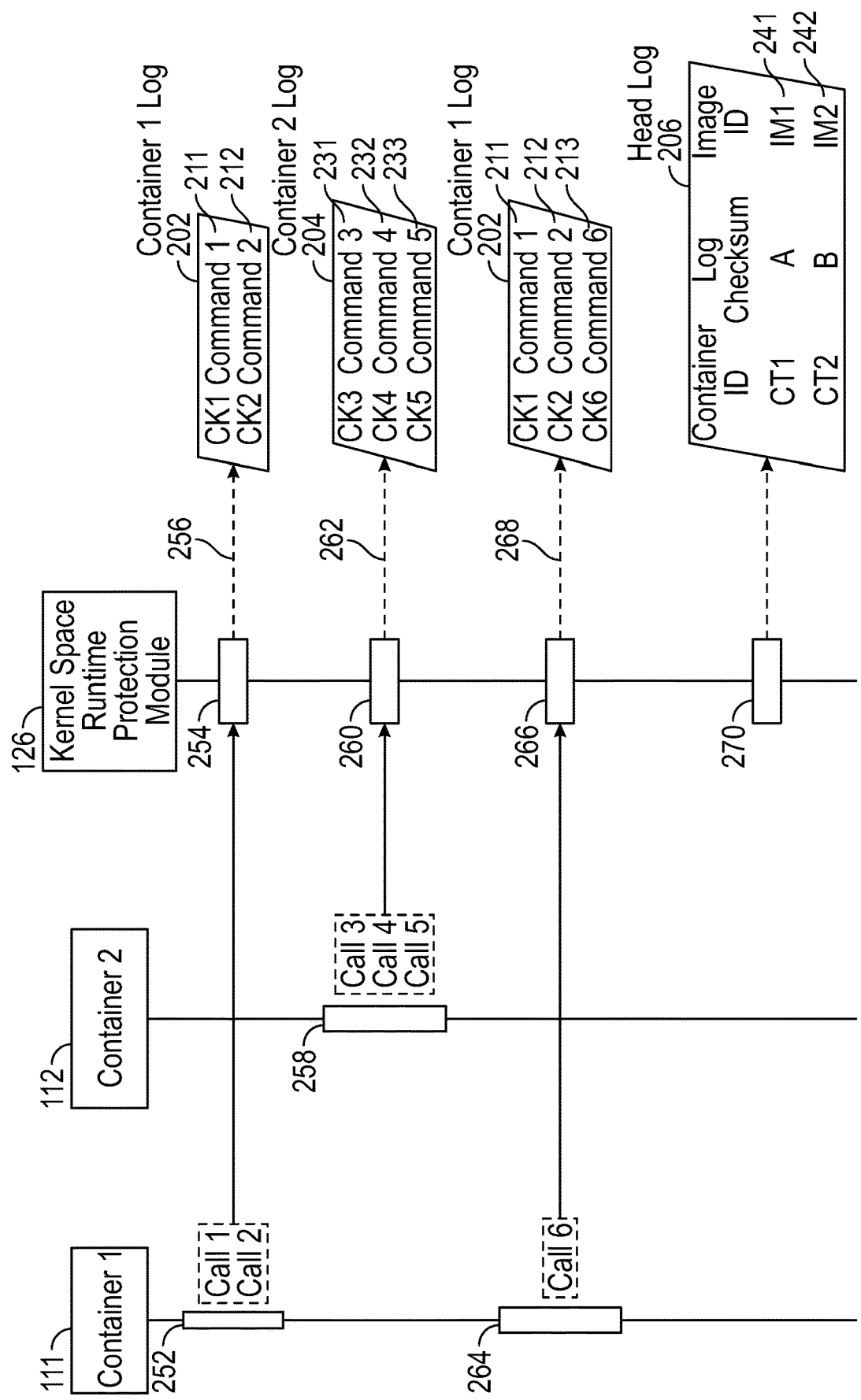
FIGS. 2-4 are message flow diagrams of processes according to some examples.

The following refers further to FIG. 2, which is a message flow diagram illustrating tasks of the containers 111 and 112 and the kernel space runtime protection module 126. Note that the tasks of FIG. 2 can be performed in an order different from that depicted, and at least some of the tasks may be performed concurrently. As used here, a "call" can refer generally to a command (e.g., syscall if the OS 106 is Linux) issued by a program during execution of the program in a container, where the command invokes a program file 150. "Invoking" a program file can refer to launching program code for execution, and/or accessing data or a configuration file, and so forth. In the example of FIG. 2, a program in the container 111 issues (at 252) call 1 followed by call 2. Call 1 and call 2 are intercepted (at 254) by the kernel space runtime protection module 126, which updates (at 256) a container 1 log 202 for the container 111. More specifically, the kernel space runtime protection module 126, in response to intercepting call 1 and call 2 from the container 111, adds a first log entry 211 for call 1 to the log 202, and adds a second log entry 212 for call 2 to the log 202. The kernel space runtime protection module 126 also updates (at 270) head log entry 241 in a head log 206 (discussed further below).

In some examples, not all calls of program files are intercepted by the kernel space runtime protection module 126. Rather, the kernel space runtime protection module 126 can intercept calls of program files based on a monitoring policy at the kernel space runtime protection module 126. The monitoring policy can specify the types program file calls that are intercepted. For example, the monitoring policy can specify that calls of executable program files are intercepted, while calls that access data are not intercepted. As another example, the monitoring policy can specify that calls to open configuration files are intercepted, while calls of other types of program files are not intercepted.

The monitoring policy can be defined at build time of the runtime protection mechanism according to some examples of the present disclosure. In some examples, subsequent modification (after the build of the runtime protection mechanism mechanism) of the monitoring policy is not allowed. In other examples, the monitoring policy can be modified dynamically during operation of the runtime protection mechanism.

As used here, a "log" can refer to any data record that is used to store information relating to calls made by a program in a container. Additionally, "updating" a log can refer to creating the log (if the log did not previously exist) or adding a log entry to the log. The kernel space runtime protection module 126 is able to intercept a call using capabilities of the OS kernel 124 and by interacting with the container runtime daemon 132.

The first log entry 211 of the log 202 includes a checksum CK1 computed based on a program file invoked by call 1, and a command (Command 1) of call 1. The second log entry 212 of the log 202 includes a checksum CK2 computed based on a program file invoked by call 2, and a command (Command 2) of call 2. In some examples, a checksum is a hash value produced by applying a hash function (e.g., a cryptographic hash function) on at least a portion of a program file. Examples of hash functions can include a Secure Hash Algorithm (SHA)-1 function, an SHA-2 function, an SHA-3 function, and so forth. In other examples, a checksum can be a value (e.g., a numerical value, an alphanumeric value, etc.) produced based on applying a different function on at least a portion of a program file.

Although FIG. 2 shows specific examples of log entries in container logs, different information can be stored in container logs in other examples. The kernel space runtime protection module 126 stores the container 1 log 202 in the memory 154 of the computer 102 (FIG. 1).

As further shown in FIG. 2, a program in the container 112 issues (at 258) calls 3, 4, and 5, which are intercepted (at 260) by the kernel space runtime protection module 126. In response to intercepting calls 3, 4, and 5, the kernel space runtime protection module 126 updates (at 262) a container 2 log 204 for the container 112, with respective log entries 231, 232, and 233 for calls 3, 4, and 5. Each log entry of the log 204 contains a corresponding checksum and command. The kernel space runtime protection module 126 also updates (at 270) a head log entry 242 in the head log 206.

After calls 1 and 2 are issued from the container 111, a program in the container 111 issues (at 264) call 6, which is intercepted (at 266) by the kernel space runtime protection module 126. In response to intercepting call 6, the kernel space runtime protection module 126 updates (at 268) the container 1 log 202 for the container 111, by adding another log entry 213 corresponding to call 6. The kernel space runtime protection module 126 stores the container 2 log 204 in the memory 154 of the computer 102 (FIG. 1). The kernel space runtime protection module 126 also updates (at 270) the head log entry 241 in a head log 206 (by recomputing the log checksum).

In some examples, as noted above, the kernel space runtime protection module 126 can update (270) a head log 206, which contains the head log entries 241 and 242 corresponding to respective different containers (e.g., 111 and 112). In some examples, each head log entry includes the following: a container identifier (ID), which is an identifier of the corresponding container; a log checksum computed based on applying a function (e.g., a cryptographic hash function, etc.) on at least a portion of the content of a respective log for the corresponding container; and a container image ID, which is an identifier of a container image from which the corresponding container was invoked.

In the example of FIG. 2, the head log entry 241 contains the container ID (CT1) of the container 111, a log checksum (A) derived based on the container 1 log 202 after the update (at 268) performed in response to call 6, and a container image ID (IM1) that is the identifier of the container image for the container 111. Note that the head log entry 241 is updated after each update of the container 1 log 202. Thus, when the container 1 log 202 is updated (at 256), a first update of the head log entry 241 is performed (which would produce a log checksum different from A). Then, when the container 1 log 202 is updated again (at 268), a second update of the head log entry 241 is performed (which would produce the log checksum A). Similarly, the head log entry 242 contains the container ID (CT2) for the container 112, a log checksum (B) derived based on the container 2 log 204 after the update (at 262), and a container image ID (IM2) of the container image for the container 112. The container images may be part of the program files 150 stored in the storage medium 152 of FIG. 1, for example.

The kernel space runtime protection module 126 stores the head log 206 in the memory 154 of the computer 102 (FIG. 1). Although FIG. 2 shows specific examples of head log entries in the head log 206, different information can be stored in head logs in other examples.

The logs 202, 204, and 206 include context information that are used to validate invocations of program files, as discussed further below. In the example of FIG. 1, the context information of the logs 202, 204, and 206 include checksums associated with respective commands of calls made by containers, container IDs of the containers, log checksums derived based on container logs, and container image IDs of container images for the containers. In further examples, the context information in the logs can contain additional or alternative information, such as a label indicating a type of a program file, a namespace and/or other metadata of a container, computing environmental information of a physical computing environment or a virtual computing environment, program file attribute information, and so forth.

Environmental information of a virtual computing environment can include information of pods that include containers (in examples where Kubernetes is used), information of a type of virtualization employed (e.g., Kubernetes, Docker, etc.), hypervisor information, and so forth. Environmental information of a physical computing environment can include information of computing nodes, information of resources in the computing nodes, information of a cluster that a computing node is part of, and so forth. Program file attribute information can include attributes of a program file, such as a size, timestamp, owner, permissions, path, type, etc., of the program file.

A namespace abstracts a system resource (e.g., a resource of the computer 102), and allows the system resource to appear as an instance of the system resource to processes (e.g., containers) belonging to the namespace, where the instance of the system resource is isolated from processes not belonging to the namespace. Namespaces enable process isolation for implementing container-based virtualization.

The in-host part of the runtime protection mechanism can send the logs 202, 204, and 206 (along with other information discussed further below) with an attestation request to the security engine 104 to perform validation of the invocations of the program files. An "attestation request" can refer to a request to validate an invocation of a program file (or multiple program files) in the requester (e.g., the computer 102). Two validations are to be performed. First, a validation is performed of the attestation request, such as by validating a source of the attestation request by checking an integrity of the information of the attestation request using any or some combination of the following: a PCR quote (discussed below), keys, nonces, checksums, etc. Second, a validation is performed of measurements (checksums) included in the container and head logs. In response to the attestation request, the security engine 104 can provide a notification to the computer 102 regarding whether or not the validation is successful, and possibly can include information relating to an enforcement action to take. The enforcement action can include any or some combination of the following: allow a program file invocation if the validation is successful, prevent execution of a program file invocation if the validation is not successful, provide an alert if the validation is not successful, and so forth.

As further shown in FIG. 1, the security engine 104 is able to access reference information 160 stored in a repository 162 of the trusted computer system 140. The repository 162 can be in the form of a table, a database, and so forth. The reference information 160 can be compared to information provided with an attestation request received by the security engine 104 from the in-host part of the runtime protection mechanism, to determine whether or not program file invocation(s) can be validated. Validation of the program file invocation(s) can use a policy contained in policy information 164, which can be stored in the repository 162. The policy information 164 includes policies that are context-specific; in other words, different policies are applied in different contexts, based on the context information accompanying an attestation request. A policy can specify an enforcement action based on validation of program file invocation(s).

The reference information 160 is created by the security engine 104 or another entity, which can be a human, a program, or a machine. The reference information can include reference checksums computed based on program files. The reference checksums are compared by the security engine 104 to checksums contained in logs (e.g., 202, 204, 206) accompanying an attestation request from the in-host part of the runtime protection mechanism. Note that the checksums in the logs are runtime checksums associated with program files invoked during runtime of containers in a host computer (e.g., 102 in FIG. 1). If the runtime checksums provided with an attestation request do not match respective reference checksums, then that can indicate a failed validation due to corruption of program files, for example. The foregoing assumes that the reference checksums are for permitted program files.

In further examples, reference checksums may be provided for disallowed program files (e.g., identified in a deny list), which are program files that are known to be corrupted or contain malware. In such further examples, if the checksums provided with an attestation request match the reference checksums, then that indicates that corrupted program files have been invoked.

In some examples, context information accompanying an attestation request can also include a security processor protection value that is used to indicate that other context information, such as logs, are valid (in other words, the context information itself has not been corrupted). In some examples, the security processor protection value can be part of a Platform Configuration Register (PCR) quote. As shown in FIG. 1, the TPM 156 includes a collection of PCRs 158. A PCR is a storage element that stores the output of a checksum computation, such as the output of a cryptographic hash function. A PCR acts as an accumulator. When a value of the PCR is updated (extended), the new value for the PCR depends both on a new computed value (new computed checksum) and an existing value (existing computed checksum) that existed in the PCR, to ensure that once the PCR has stored a value it is not possible to forge the value of the PCR. For example, a new PCR value is derived based on applying a function (e.g., hash function) on a concatenation of an existing PCR value and a new computed value. Such an operation refers to extending the existing PCR value in the PCR with the new computed value.

A "PCR quote" is a PCR value (such as the PCR value in a PCR 158) signed using a digital signature by the TPM 156. The PCR quote (or more generally, a security processor protection value) provided with an attestation request from the in-host part of the runtime protection mechanism to the security engine 104 can be part of a chain of context information used by the security engine 104 in validating a program file(s).

Figure 3A:
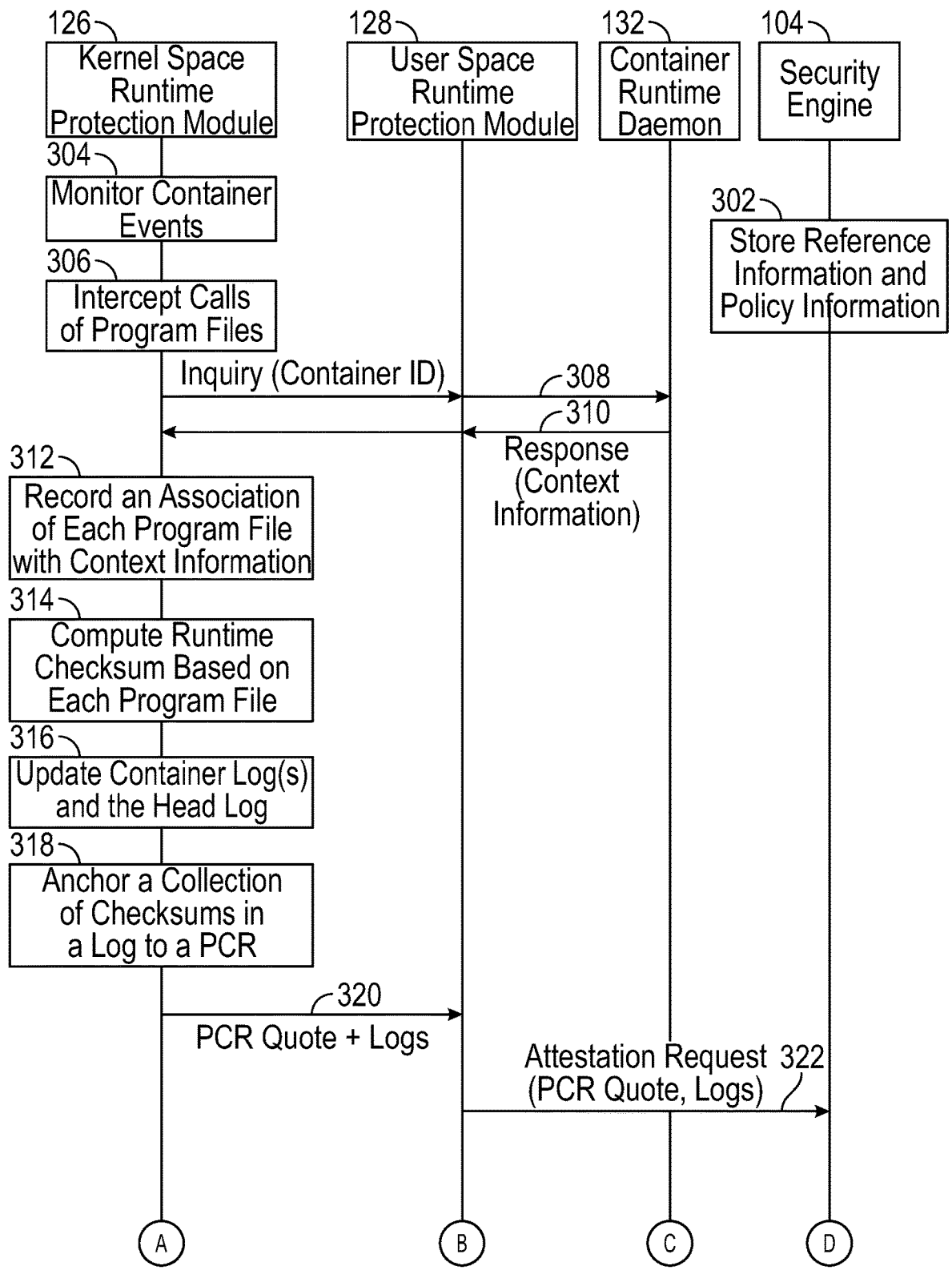
Figure 3B:
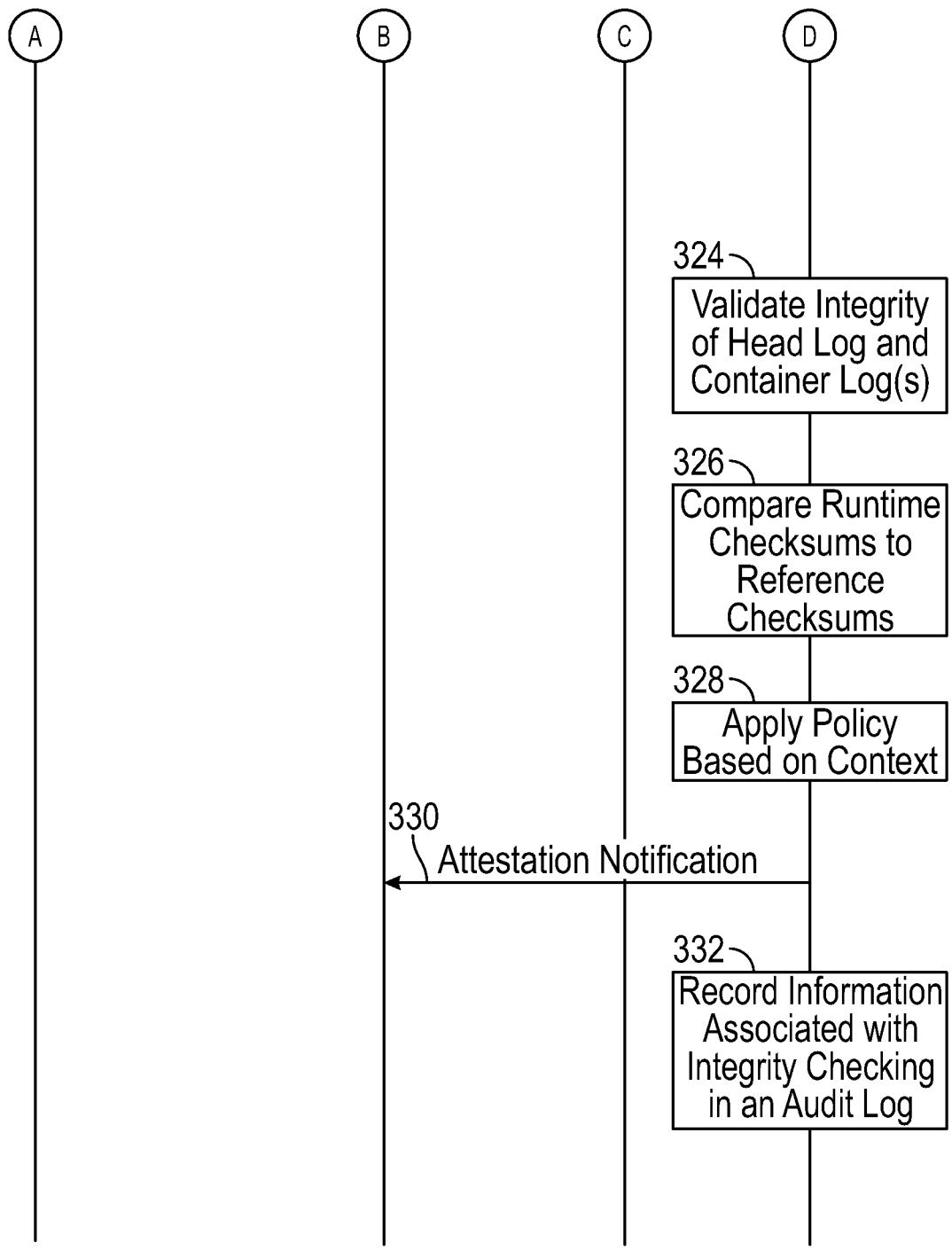

FIGS. 3A-3B depict a message flow diagram of a process including tasks of the following components: the kernel space runtime protection module 126, the user space runtime protection module 128, the container runtime daemon 132, and the security engine 104. Note that the order of the tasks of FIGS. 3A-3B may be changed in other examples, or some of the tasks of FIGS. 3A-3B may be omitted or replaced with other tasks, or additional tasks may be included in further examples.

The security engine 104 stores (at 302) the reference information 160 and the policy information 164 in the repository 162 (FIG. 1). The reference information 160 (including information as discussed above) can be created by the security engine 104 or by another entity. The policy information 164 may be created by another entity and provided to the security engine 104. Policies in the policy information 164 can be used in determining whether a program file invocation is allowed, and an enforcement action to take for the program file invocation.

The kernel space runtime protection module 126 monitors (at 304) container events, such as events relating to calls of program files and events relating to attempted modification of logs (e.g., the logs 202, 204, 206). The kernel space runtime protection module 126 can check to prevent any modification of logs unless performed by the kernel space runtime protection module 126 or another authorized entity.

The kernel space runtime protection module 126 also intercepts (at 306) calls of program files. Because the kernel space runtime protection module 126 interacts with the container runtime daemon 132 to intercept a call of a program file, the kernel space runtime protection module 126 is provided with the container ID of the container from which the call issued. The kernel space runtime protection module 126 sends (at 308) an inquiry to obtain additional context information for the container identified by the container ID. The inquiry can include the container ID. The kernel space runtime protection module 126 can forward the inquiry to the user space runtime protection module 128, which forwards the inquiry to the container runtime daemon 132.

In response to the inquiry with the container ID, the container runtime daemon 132 sends (at 310) a response containing the context information for the container, including the container image ID of the container image for the container, and other context information as listed further above. The response is sent to the user space runtime protection module 128, which forwards the response to the kernel space runtime protection module 126.

Based on the response from the container runtime daemon 132, the kernel space runtime protection module 126 is able to record (at 312) an association of each program file being invoked (e.g., as represented by a name and path of the program file) with context information such as the container ID, the container image ID, and additional attributes such as a label indicating a type of a program file, a namespace of the container, computing environmental information of a physical computing environment or a virtual computing environment, program file attribute information, and so forth.

The kernel space runtime protection module 126 computes (at 314) a runtime checksum based on each program file invoked. For each call from a container, the kernel space runtime protection module 126 updates (at 316) a container log (e.g., 202 or 204) for the container, by adding a log entry corresponding to the program file to the container log. The log entry can include any or some combination of the context information discussed above. If there are calls from multiple containers, then the kernel space runtime protection module 126 updates multiple container logs for the multiple containers. In other examples, a container log can include log entries for multiple containers in a defined partition (examples of partitions are discussed further above). The kernel space runtime protection module 126 also updates (at 316) the respective head log entry (or entries) of the head log 206.

The kernel space runtime protection module 126 anchors (at 318) a collection of checksums included in a log to a PCR 158 in the TPM 156. More specifically, in some examples, the collection of checksums included in a head log (e.g., 206 in FIG. 2) is anchored to the PCR 158. For example, in FIG. 2, the head log 206 includes the head log entry 241 that contains the checksum (A) derived based on the container 1 log 202, and the head log entry 242 that contains the checksum (B) derived based on the container 2 log 204. A checksum computed based on the head log 206 (referred to as the "head log checksum") can be used to extend the value in the PCR 158.

Anchoring the collection of checksums included in the head log to the PCR 158 refers to extending the PCR 158 with the head log checksum computed based on the head log, and generating a digital signature for the head log checksum when the head log checksum is retrieved from the PCR 158, to allow for a verification that the head log has not been corrupted and its origin can be confirmed.

For performance and scale considerations, one PCR may be used to anchor checksums for multiple head log entries. More generally, the kernel space runtime protection module 126 can associate security processor protection values with checksums in logs (head logs and/or container logs) to allow for a detection of corrupted logs.

In response to a triggering event, the user space runtime protection module 128 obtains (at 320) the PCR quote from the TPM 156 and associated logs (e.g., 202, 204, and 206) from the memory 154 by requesting the PCR quote from the kernel space runtime protection module 126. In some examples, the triggering event may include a time-based event based on a passage of time (e.g., expiration of a timer), an event corresponding to a number of calls of program files detected, and so forth. The user space runtime protection module 128 sends (at 322) the PCR quote and the associated logs with an attestation request to the security engine 104.

The security engine 104 uses the PCR quote to validate (at 324) an integrity of the head log 206 (i.e., to ensure that the head log 206 has not been corrupted). The security engine 104 also validates the integrity of the container log(s) using the log checksums in the head log entry (or entries). Assuming the head log 206 is validated, the security engine 104 compares (at 326) runtime checksums for program files in the container logs (e.g., 202 and 204) with reference checksums in the reference information 160 (assuming the reference information 160 contains checksums for the program files).

In some examples, for each program file (Fx), the security engine 104 determines if an entry exists in the reference information 160 for Fx, or in another example, if an entry exists in the reference information 160 for Fx and a context (e.g., which container issued the invocation of Fx, etc.) associated with the invocation of Fx. If the entry exists, then a reference checksum for Fx can be retrieved from the entry of the reference information 160, and compared to the corresponding runtime checksum in a container log.

The security engine 104 further applies (at 328) a policy based on the context for each program file invocation. The policy information 164 of FIG. 1 includes multiple policies, which can be applicable in respective different contexts. For example, a first policy is applied for a first container image, a second policy is applied for a second container image, and so forth. For example, if a particular program file was invoked from the container 111 launched from the first container image, then the first policy would be applied. On the other hand, if the same particular file was invoked from the container 112 launched from the second container image, then the different second policy would be applied. The first policy may specify that the invocation of the particular program file from the container 111 is allowed if the runtime checksum for the particular program file matches the corresponding reference checksum, but that the invocation would not be allowed if the checksums do not match. The second policy may specify that the invocation of the particular program file from the container 112 is to be blocked (when possible) and a signal raised as a security violation alert regardless of whether the checksums match. In other examples, different policies can be applied in other types of contexts, such as different clusters, different host computers, different tenants, different times or dates, and so forth.

In some cases, the reference information 160 may not contain an entry for Fx (or for the combination of Fx and the context for the invocation of Fx). In such latter cases, the comparison of checksums can be skipped, and the security engine can apply (at 326) a policy for an unregistered or unknown program file. The policy can specify what enforcement action to take for the invocation of Fx that is unregistered or unknown.

Based on the applied policy, the security engine 104 sends (at 330) an attestation notification that is responsive to the attestation request sent at 322. The attestation notification can indicate that the program file invocation is allowed, is to be blocked, or can indicate another enforcement action.

In some examples, the security engine 104 can record (at 332) in an audit log information associated with the integrity checking of each program file. For example, the security engine 104 can record in the audit log any or some combination of the following: information of the program file, a checksum of the program file, a policy applied, a timestamp, a location regarding where the program file was invoked, and so forth. The audit log can be used for analysis and profiling, such as to determine operational risks, study the behavior of entities in a system, for training and inference in artificial intelligence or machine learning systems, and so forth.

Figure 4:
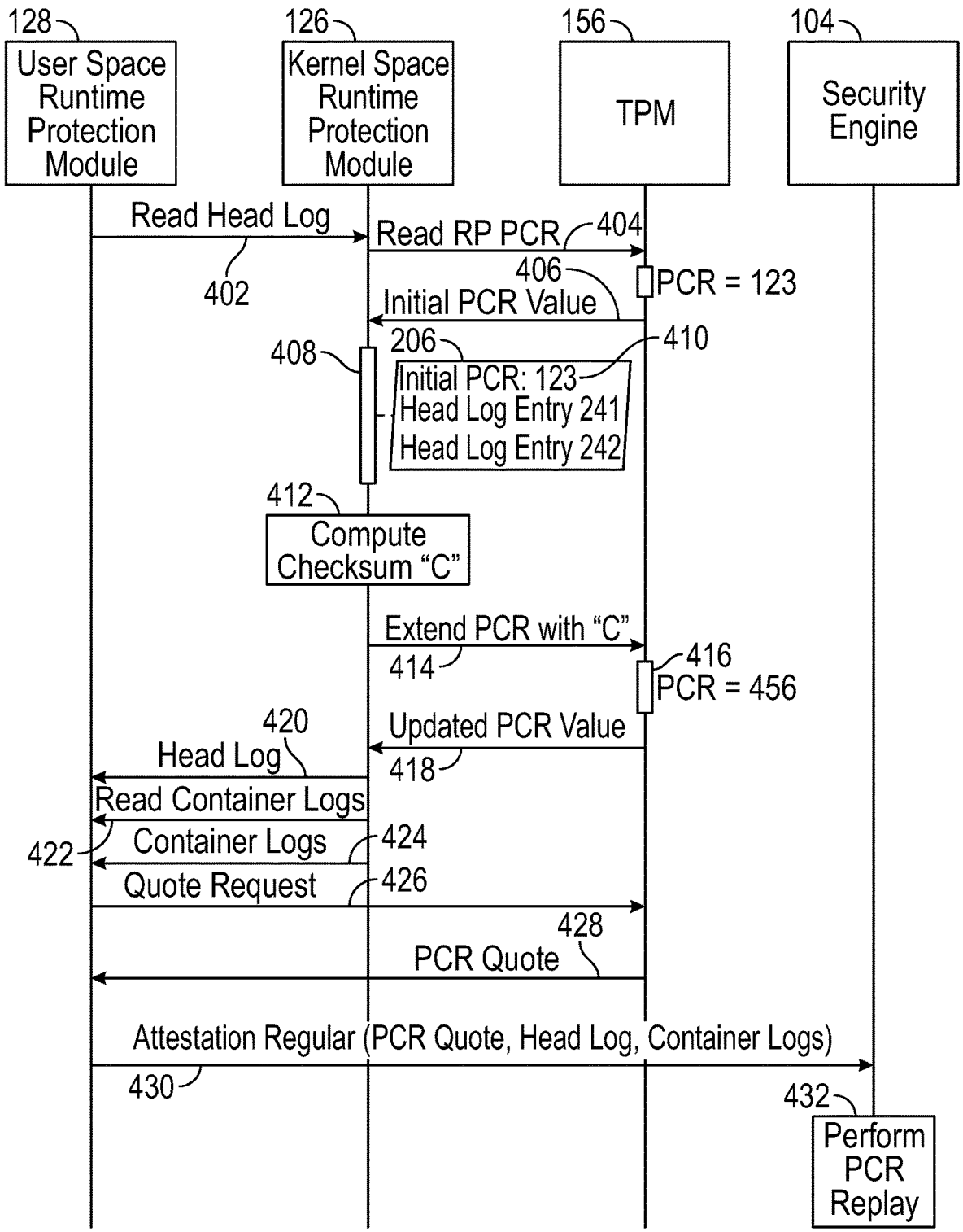

FIG. 4 is a message flow diagram of a process including tasks of the following components: the user space runtime protection module 128, the kernel space runtime protection module 126, the TPM 156, and the security engine 104. The tasks are those involved with tasks 320, 322, 324, and 326 in FIGS. 3A-3B. Note that the order of the tasks of FIG. 4 may be changed in other examples, or some of the tasks of FIG. 4 may be omitted or replaced with other tasks, or additional tasks may be included in further examples.

In response to a triggering event (discussed above in connection with FIGS. 3A-3B), the user space runtime protection module 128 issues (at 402), to the kernel space runtime protection module 126, a request to read the head log 206. In response to the request, the kernel space runtime protection module 126 sends (at 404), to the TPM 156, a runtime protection (RP) PCR read request to read a PCR (e.g., 158 in FIG. 1) associated with the runtime protection mechanism. In the example of FIG. 4, it is assumed that an existing value of the PCR 158 is "123" (this value will be referred to as an "initial PCR value"). In response, the TPM 156 sends (at 406) the initial PCR value ("123") to the kernel space runtime protection module 126.

In the example of FIG. 4, the kernel space runtime protection module 126 updates (at 408) the head log 206 with an initial PCR value entry 410 that contains the initial PCR value ("123"). Note that the head log 206 has also been updated with head log entries (e.g., 241 and 242) corresponding to updates of respective container logs. The kernel space runtime protection module 126 computes (at 412) a checksum (e.g., a hash value) based on the content of the updated head log 206. In the example, the checksum for the head log 206 is "C."

The kernel space runtime protection module 126 extends (at 414) the PCR 158 with the "C" value for the head log 206. In response to the extending operation initiated by the kernel space runtime protection module 126, the TPM 156 extends (at 416) the PCR 158 with the "C" value, to produce an updated PCR value "456" that is stored in the PCR 158. In some examples, although not shown, the PCR 158 may also be extended with checksums of the container logs. In other examples, the PCR 158 is not extended with checksums of the container logs. The updated PCR value is then added to the head log 206.

The TPM 156 sends (at 418) the updated PCR value ("456") to the kernel space runtime protection module 126. In response, the kernel space runtime protection module 126 sends (at 420) the head log 206 containing a current value of PCR to the user space runtime protection module 128. In the example, the current value of PCR is equal to "456."

In response to receiving the head log 206, the user space runtime protection module 128 sends (at 422) a read request to the kernel space runtime protection module 126 to read container logs at the kernel space runtime protection module 126, which can include 202, 204, for example. In response to the read request, the kernel space runtime protection module 126 sends (at 424) the container logs to the user space runtime protection module 128.

The user space runtime protection module 128 then issues (at 426) a PCR quote request to the TPM 156. In response, the TPM 156 returns (at 428) a PCR quote, which includes a digitally signed version of the current PCR value ("456").

The user space runtime protection module 128 sends (at 430) an attestation request to the security engine 104. The attestation request can include the PCR quote and the head and container logs.

In response to the attestation request, the security engine 104 performs (at 432) a PCR replay, which includes computing a checksum on the head log 206 to derive the head log checksum (e.g., "C"), extracting the initial PCR value ("123") from the initial PCR value entry 410 of the head log 206, and extending the initial PCR value with "C" to compute the updated PCR value "456." The security engine 104 then decrypts the PCR quote to obtain the PCR value of the PCR quote ("456") and compares the PCR value of the PCR quote to the computed updated PCR value. If the PCR values match, then that indicates that the head log 206 received at the security engine 104 has not been corrupted.

The security engine 104 can further compute checksums on the container logs 202 and 204 received with the attestation request, and compare the computed checksums of the container logs 202 and 204 to the checksums "A" and "B" in the head log entries 241 and 242, respectively. If the checksums of the container logs 202 and 204 match the checksums "A" and "B" in the head log entries 241 and 242, respectively, then that validates the integrity of the container logs 202 and 204.

Figure 5:
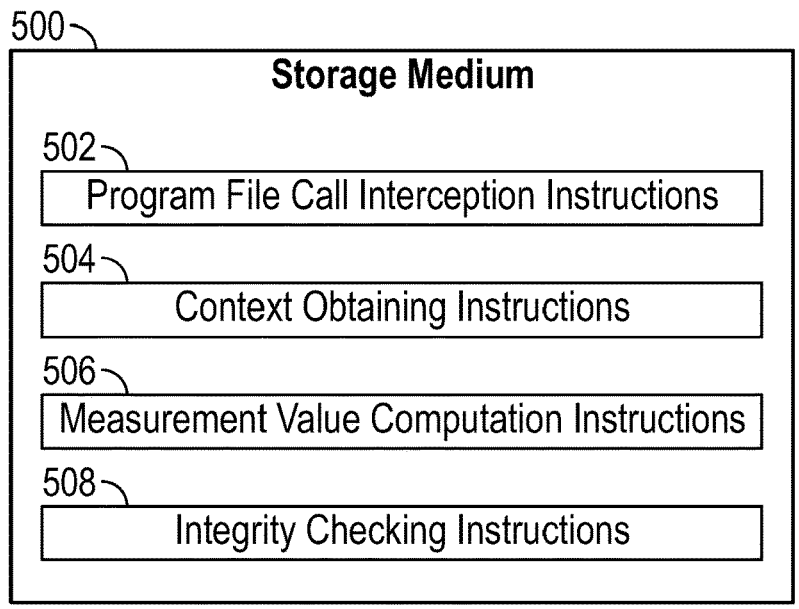
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system (e.g., a computer or multiple computers) to perform respective tasks. The machine-readable instructions include the following instructions that execute during runtime of a virtual computing environment, such as a container, a VM, and so forth.

The machine-readable instructions include program file call interception instructions 502 to intercept a call for an invocation of a program file that relates to a program execution in the virtual computing environment. In some examples, the call can be intercepted by a kernel space entity, such as the kernel space runtime protection module 126. In some examples, the interception can be based on a monitoring policy that specifies the types program file calls that are intercepted.

The machine-readable instructions include context obtaining instructions 504 to obtain, for the program file prior to the invocation of the program file in response to the call, context information of the virtual computing environment. In some examples, the context information includes an identifier of a program code image (e.g., a container image) for the virtual computing environment. The context information can further include an identifier of the virtual computing environment (e.g., an identifier of a container), and other context information.

The machine-readable instructions include measurement value computation instructions 506 to compute a measurement value based on the program file. In some examples, the measurement value is a checksum, such as a cryptographic hash value.

The machine-readable instructions include integrity checking instructions 508 to provide the measurement value and the context information of the virtual computing environment to an integrity checker to perform a context-specific validation of the program file. In some examples, the context-specific validation of the program file employs a policy that is based on the identifier of the program code image and/or other context information, such as information of an execution environment of the virtual computing environment (such as any of the environmental information of a virtual computing environment noted further above), program file attribute information, and so forth.

In some examples, a first entity in the kernel space (e.g., the kernel space runtime protection module 126) sends, to a second entity in a user space (e.g., the user space runtime protection module 128), a query for the identifier of the program code image. The first entity in the kernel space receives the identifier of the program code image from the second entity in the user space.

In some examples, the machine-readable instructions store the measurement value in a record (e.g., a container log such as 202 or 204) along with a command corresponding to the call for the invocation of the program file. The machine-readable instructions can compute a record checksum based on the record that contains checksums for a plurality of program files called from the virtual computing environment, and include the record checksum in a further record (e.g., a head log such as 206) that associates the record checksum with the identifier of the program code image.

In some examples, the machine-readable instructions associate the measurement value with a register of a security processor. This can involve anchoring the measurement value (which can be part of a collection of measurement values) with a PCR of a TPM. The value of the register can be sent along with the measurement value to the integrity checker to perform the context-specific validation of the program file.

In some examples, the machine-readable instructions add the measurement value to a record (e.g., a container log). The record can be associated individually with the virtual computing environment in some examples. In other examples, the record is an aggregate record that contains measurement values and identifiers of program code images for multiple virtual computing environments that are part of a specified partition, such as a pod, a given cluster of computing nodes, a partition of containers running a given application program, a partition of containers launched by a given requester (e.g., a tenant), and so forth.

Figure 6:
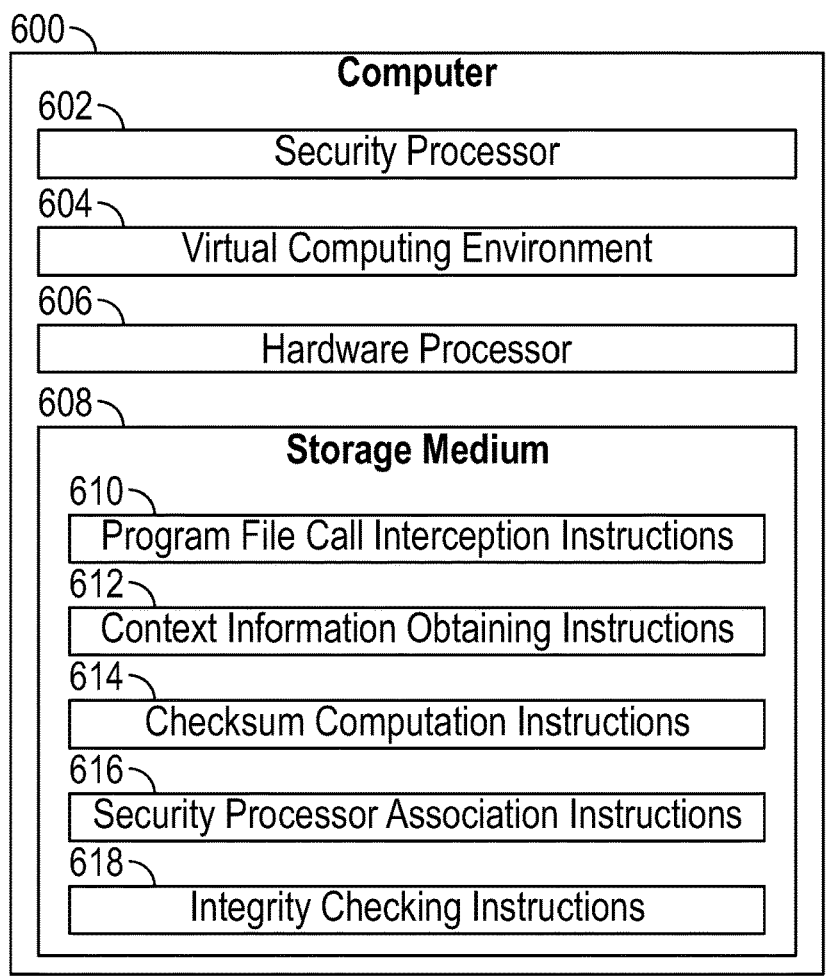
FIG. 6 is a block diagram of a system according to some examples.

FIG. 6 is a block diagram of a computer 600 according to some examples. The computer 600 can correspond to the computer 102 of FIG. 1, for example. The computer 600 includes a security processor 602. The security processor 602 can be a TPM, for example.

The computer 600 includes a virtual computing environment 604. The virtual computing environment 604 can be a container, a VM, and so forth.

The computer 600 further includes a hardware processor 606 (or multiple hardware processors). A hardware processor can include a microprocessor, a core of a multi-core microprocessor, a microcontroller, a programmable integrated circuit, a programmable gate array, or another hardware processing circuit.

The computer 600 further includes a storage medium 608 storing runtime protection instructions executable on the hardware processor 606 to perform various tasks. Machine-readable instructions executable on a hardware processor can refer to the instructions executable on a single hardware processor or the instructions executable on multiple hardware processors.

The runtime protection instructions are executed during runtime of the virtual computing environment 604. The runtime protection instructions include program file call interception instructions 610 to intercept a call for an invocation of a program file that relates to a program execution in the virtual computing environment 604.

The runtime protection instructions include context information obtaining instructions 612 to obtain, for the program file prior to the invocation of the program file in response to the call, context information of the virtual computing environment. The context information can include an identifier of a program code image for the virtual computing environment, an identifier of the virtual computing environment, and/or other context information.

The runtime protection instructions include checksum computation instructions 614 to compute a checksum based on the program file. For example, the checksum computation instructions 614 can apply a cryptographic hash function on the program file to obtain a hash value as the checksum.

The runtime protection instructions include security processor association instructions 616 to associate the checksum with a protection value of the security processor. For example, the checksum can be anchored to a PCR of a TPM. More specifically, this anchoring can be based on anchoring a checksum of a head log with the PCR.

The runtime protection instructions include integrity checking instructions 618 to provide the checksum and the context information of the virtual computing environment to an integrity checker to perform a context-specific validation of the program file, prior to the invocation of the program file. The invocation of the program file can include an execution of the program file, an access (e.g., opening) of the program file, and so forth.

Figure 7:
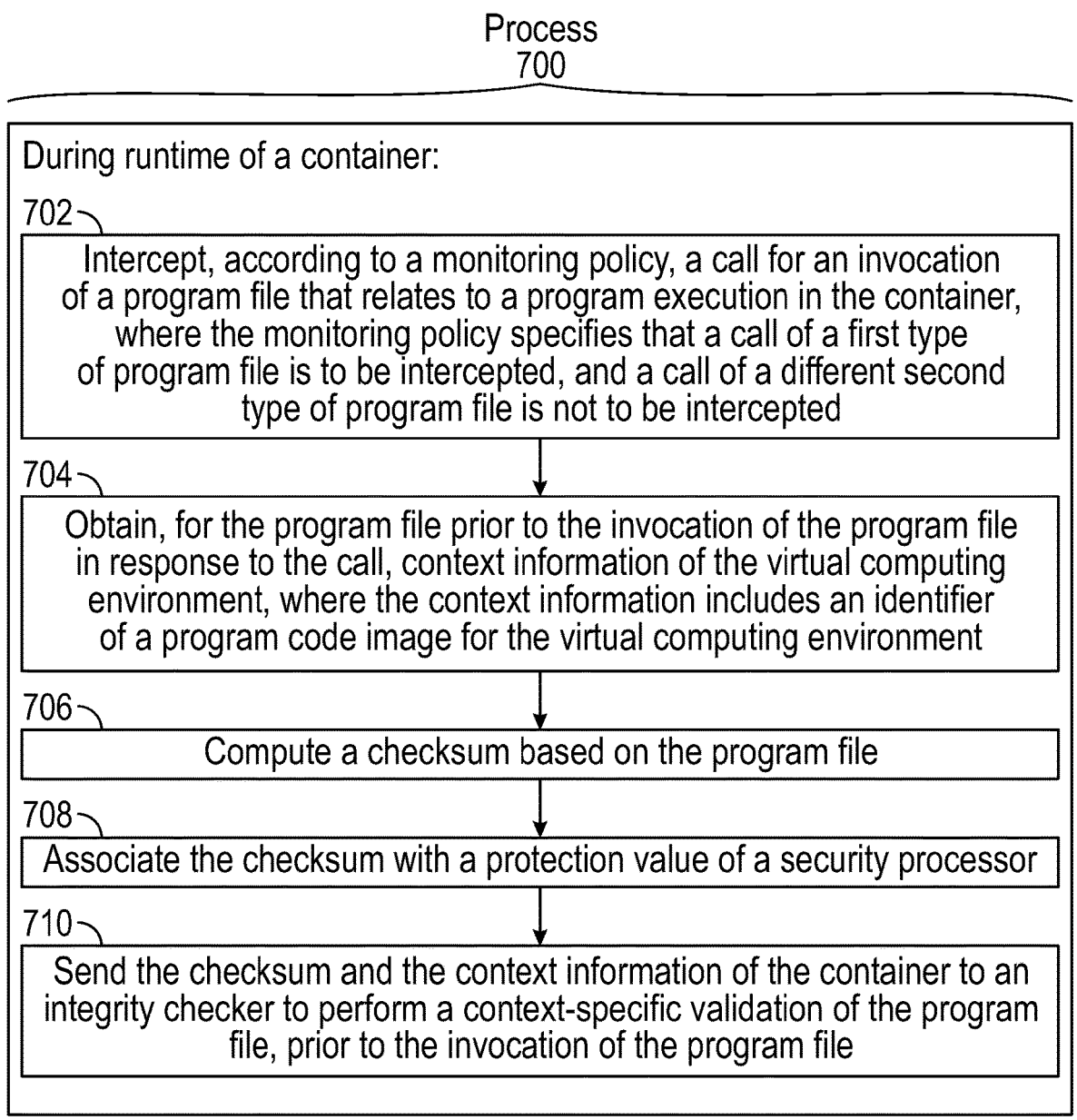
FIG. 7 is a flow diagram of a process according to some examples.

FIG. 7 is a flow diagram of a process 700 according to some examples. The process 700 includes performing the following tasks during runtime of a container. The process 700 includes intercepting (at 702), by a runtime protection system according to a monitoring policy, a call for an invocation of a program file that relates to a program execution in the container. The monitoring policy specifies that a call of a first type of program file is to be intercepted, and a call of a different second type of program file is not to be intercepted. The runtime protection system can include the kernel space runtime protection module 126 and the user space runtime protection module 128, for example.

The process 700 includes obtaining (at 704), by the runtime protection system for the program file prior to the invocation of the program file in response to the call, context information of the virtual computing environment. The context information includes an identifier of a program code image for the virtual computing environment, and other context information.

The process 700 includes computing (at 706), by the runtime protection system, a checksum based on the program file. The checksum can include a cryptographic hash, for example.

The process 700 includes associating (at 708), by the runtime protection system, the checksum with a protection value of a security processor. This association can include anchoring a log to a PCR of a TPM, for example.

The process 700 includes sending (at 710), from the runtime protection system, the checksum and the context information of the container to an integrity checker to perform a context-specific validation of the program file, prior to the invocation of the program file.

A storage medium (e.g., 500 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
during runtime of a virtual computing environment:
intercept a call for an invocation of a program file that relates to a program execution in the virtual computing environment;
compute a checksum based on the program file;
obtain, for the program file prior to the invocation of the program file in response to the call, context information of the virtual computing environment, the context information comprising an identifier of a program code image for the virtual computing environment, a log containing a command that invoked the program file and the checksum computed based on the program file, and a further checksum based on the log that contains the command and the checksum;
send, from the system to an integrity checker as part of an attestation to perform a context-specific validation of the invocation of the program file, the context information comprising the identifier of the program code image, the log, and the further checksum based on the log; and
receive, at the system from the integrity checker, a response containing a result of the attestation that uses the log and the further checksum based on the log.

2. The non-transitory machine-readable storage medium of claim 1, wherein the context information obtained for the program file further comprises an identifier of the virtual computing environment.

3. The non-transitory machine-readable storage medium of claim 1, wherein the context-specific validation of the program file employs a policy that is based on the identifier of the program code image.

4. The non-transitory machine-readable storage medium of claim 3, wherein the context information further comprises information of an execution environment of the virtual computing environment, and the policy for the context-specific validation is further based on the information of the execution environment.

5. The non-transitory machine-readable storage medium of claim 1, wherein the intercepting of the call is by a first entity in a kernel space of the system.

6. The non-transitory machine-readable storage medium of claim 5, wherein the instructions upon execution cause the system to:
send, from the first entity in the kernel space to a second entity in a user space, a query for the identifier of the program code image; and
receive, at the first entity in the kernel space, the identifier of the program code image from the second entity in the user space.

7. The non-transitory machine-readable storage medium of claim 1, wherein the instructions upon execution cause the system to:
store, in the log, the checksum along with the command corresponding to the call for the invocation of the program file, wherein the checksum stored in the log comprises a cryptographic hash value computed based on the program file; and
compute the further checksum based on the log containing the checksum and the command.

8. The non-transitory machine-readable storage medium of claim 1, wherein the log contains checksums for a plurality of program files called from the virtual computing environment, and wherein the instructions upon execution cause the system to:
compute the further checksum by applying a cryptographic hash function on the log that contains the checksums for the plurality of program files; and
include the further checksum in a further log that associates the further checksum with the identifier of the program code image.

9. The non-transitory machine-readable storage medium of claim 8, wherein the instructions upon execution cause the system to:
associate the further log with a register of a security processor; and
send a value of the register along with the further log to the integrity checker to perform the context-specific validation of the program file.

10. The non-transitory machine-readable storage medium of claim 9, wherein the security processor is a trusted platform module (TPM), the register is a Platform Configuration Register (PCR), and the value of the register is based on extending the PCR with a checksum computed based on the further log, and wherein the context-specific validation comprises validating the further log using a value of the PCR of the TPM.

11. The non-transitory machine-readable storage medium of claim 10, wherein the value of the PCR sent to the integrity checker is digitally signed by the security processor.

12. The non-transitory machine-readable storage medium of claim 1, wherein the log comprises an aggregate record that contains checksums and identifiers of program code images for containers that are part of a specified partition.

13. The non-transitory machine-readable storage medium of claim 1, wherein the virtual computing environment comprises a container, and the identifier of the program code image in the context information is a container image identifier.

14. A computer comprising:
a security processor;
a hardware processor; and
a non-transitory storage medium comprising runtime protection instructions executable on the hardware processor to:
during runtime of a virtual computing environment in the computer:
intercept a call for an invocation of a program file that relates to a program execution in the virtual computing environment;
compute a checksum based on the program file;
obtain, for the program file prior to the invocation of the program file in response to the call, context information of the virtual computing environment, the context information comprising an identifier of a program code image for the virtual computing environment, a log containing a command that invoked the program file and the checksum computed based on the program file, and a further checksum based on the log that contains the command and the checksum;

associate the checksum and the further checksum with a protection value of the security processor;

send the context information comprising the identifier of the program code image, the log, and the further checksum based on the log to an integrity checker to perform a context-specific validation of the program file, prior to the invocation of the program file; and receive, at the computer from the integrity checker, a response containing a result of the context-specific validation that uses the log and the further checksum based on the log.

15. The computer of claim 14, wherein the invocation of the program file is selected from among: executing the program file that includes program code, or accessing the program file.

16. The computer of claim 14, wherein the runtime protection instructions are executable on the hardware processor to:

include the further checksum and the identifier of the program code image in a further log; and provide the context information comprising the log and the further log to the integrity checker.

17. The computer of claim 14, wherein the protection value comprises a Platform Configuration Register (PCR) quote comprising a digitally signed version of a PCR value in a PCR of the security processor.

18. A method comprising:

during runtime of a container:

intercepting, by a runtime protection system according to a monitoring policy, a call for an invocation of a program file that relates to a program execution in the container, wherein the monitoring policy specifies that a call of a first type of program file is to be intercepted, and a call of a different second type of program file is not to be intercepted;

computing, by the runtime protection system, a checksum based on the program file;

obtaining, by the runtime protection system for the program file prior to the invocation of the program file in response to the call, context information of the virtual computing environment, the context information comprising an identifier of a program code image for the virtual computing environment, a log containing a command that invoked the program file and the checksum computed based on the program file, and a further checksum based on the log that contains the command and the checksum;

associating, by the runtime protection system, the checksum with a protection value of a security processor;

sending, from the runtime protection system, the context information comprising the identifier of the program code image, the log, and the further checksum based on the log to an integrity checker to perform a context-specific validation of the program file; and receiving, at the runtime protection system from the integrity checker, a response containing a result of the context-specific validation that uses the log and the further checksum based on the log.

19. The method of claim 18, wherein the checksum is a cryptographic hash value.

20. The method of claim 18, wherein the protection value comprises a Platform Configuration Register (PCR) quote comprising a digitally signed version of a PCR value in a PCR of a trusted platform module (TPM).

* * * * *